(12) United States Patent
Al-Eidan

(10) Patent No.: US 7,864,900 B2
(45) Date of Patent: Jan. 4, 2011

(54) COMMUNICATION SYSTEM FOR SENDING AND RECEIVING DIGITAL DATA

(76) Inventor: Abdullah A. Al-Eidan, P.O. Box 67175, Bayan 43762 (KW)

( * ) Notice: Subject to any disclaimer, the term of this patent is extended or adjusted under 35 U.S.C. 154(b) by 1101 days.

(21) Appl. No.: 11/554,204

(22) Filed: Oct. 30, 2006

(65) Prior Publication Data

US 2008/0101481 A1    May 1, 2008

(51) Int. Cl.
*H04L 27/10* (2006.01)
(52) U.S. Cl. ..................................... 375/345
(58) Field of Classification Search .......... 375/295, 375/202, 303, 305, 309, 311, 316, 322, 334, 375/335, 336, 259, 271, 272, 274, 275; 370/203, 370/208, 210
See application file for complete search history.

(56) References Cited

U.S. PATENT DOCUMENTS

| | | | |
|---|---|---|---|
| 5,636,247 A * | 6/1997 | Kamerman et al. | 375/260 |
| 6,011,499 A * | 1/2000 | Agarwal et al. | 341/67 |
| 7,385,915 B2 * | 6/2008 | Stolpman et al. | 370/208 |
| 2003/0223354 A1 * | 12/2003 | Olszewski | 370/208 |
| 2004/0125824 A1 * | 7/2004 | Preston et al. | 370/519 |
| 2005/0123060 A1 * | 6/2005 | Maltsev et al. | 375/260 |

* cited by examiner

*Primary Examiner*—David C Payne
*Assistant Examiner*—Vineeta S Panwalkar
(74) *Attorney, Agent, or Firm*—Lowe Hauptman Ham & Berner, LLP

(57) ABSTRACT

A system and method for constructing a transmitter and a receiver that communicate using multiple orthogonal frequencies which are locked to each other. The set of available frequencies can range from 7, 32 frequencies to a much larger set of frequencies. The transmitted frequencies are separated by a small limited bandwidth (B.W). multiple frequencies are selected from a set of available frequencies and transmitted simultaneously to the receiver. The data transmission is preceded by a calibration sequence where the shift between the transmitted frequency and the frequency measured by fast Fourier transform at the receiver system contain encoders and decoders that convert binary numbers to frequency combinations and the reverse. This transceiver system is capable of transmitting large data rate per unit of a bandwidth e.g. 6 Mbps/3.2 MHZ.

10 Claims, 17 Drawing Sheets

COMMUNICATION SYSTEM FOR SENDING AND RECEIVING DIGITAL DATA

FIELD OF THE INVENTION

The present invention relates to the transmission and reception of digital data using digital signal processors (DSP), in frequency shift keying and multiple binary orthogonal frequency based communication system. More particularly, the invention relates to a system and method for transmitting and receiving digital signals using frequency shift keying (FSK), frequency modulation (FM) and using multiple binary orthogonal frequencies

BACKGROUND OF THE INVENTION

Most of the modern communication systems generally use frequency modulation techniques to transmit analog and digital information between a transmitter and a receiver. At present the sate of the art in digital data transmission over narrow bandwidth is by using Frequency Modulation (FM) and Frequency Shift Keying (FSK). A detailed description of this technique and its background art and specifications is described in the following paragraphs.

U.S. Pat. No. 5,852,636 for Mathieu et al., describes Methods and apparatus for modulation of a Frequency Shift Keying (FSK) carrier in a very narrow band. This patent provides a method and a transmitter system for modulating binary information on a carrier in a very narrow band by Frequency Shift Keying (FSK) a carrier signal. Instead of the direct use of the frequency shift keying technique, a phase reversal keying technique is used to create a carrier with frequency shift characteristics.

The transmitter of the above referred patent generates a reference signal and a control signal, the latter having two frequencies to represent the binary data to be transmitted. A carrier signal is generated by modulation using a phase reversal technique. The resulting carrier signal is processed by high order filtering such that the output of the transmitter provides a Frequency Shift Keyed (FSK) carrier at very close frequencies. However, Mathieu fails to disclose a system and method for transmitting and receiving digital signals using Frequency Shift Keying (FSK), Frequency Modulation (FM) and using multiple binary orthogonal frequencies.

U.S. Pat. No. 5,358,202 for Tse et al. discloses a Frequency Shift Keying (FSK) demodulator using a phase locked loop and voltage comparator. The U.S. Pat. No. 4,456,985 of R. T. Carsten et al., discloses an arrangement in which full duplex above voice band Frequency Shift Keyed (FSK) data may be transmitted simultaneously with telephone signals over a subscriber's telephone signals which may be present, and they must be sufficiently high to distinguish them from voice band signals and sufficiently low that they are not unduly attenuated by the telephone line. For example, the Frequency Shift Keyed (FSK) center frequency being changed by +0.500 Hz depending on whether a data 0 or 1 is being transmitted.

In consequence, the Frequency Shift Keying (FSK) center frequencies are relatively inaccurately determined and may be subject to change due to the combined effects of component tolerances aging, and temperature changes.

With conventional Frequency Shift Keying (FSK) demodulation, the effect of an incorrect center frequency in the incoming Frequency Shift Keying (FSK) data is to produce a distorted mark/space ratio in the demodulated data. In the arrangement discussed above the distortion can be severe because the change in the Frequency Shift Keying (FSK) center frequency can be significant compared with narrow band (+0.500 Hz) which is used for Frequency Shift Keying (FSK) transmission. Such distortion can lead to errors in examining the demodulated data if transitions of the demodulated data are used to determine the times at which this data is sampled.

U.S. Pat. No. 4,486,955 to Mass et al., discloses a Frequency Shift Keying (FSK) demodulator. This demodulator is described as a circuit for detecting differences in frequency between a Frequency Shift Keying (FSK) modulated input signal and a reference signal (REF). The circuit includes a sequence generator means for producing a digital code representative of phase angle between the Frequency Shift Keying (FSK) and reference signal (REF) signals. The digital code (which is preferably a two bit binary code) changes a first predetermined sequence when the frequency of the Frequency Shift Keying (FSK) signal is less than the frequency of the reference signal (REF), and changes in a second predetermined sequence when the frequency of the Frequency Shift Keying (FSK) signal is greater than the frequency of the reference signal (REF).

The circuit, as disclosed by Mass et al., includes a first sequence detector means for detecting the occurrence of the first predetermined sequence, and a second sequence detector means for detecting the occurrence of the second predetermined sequence. Each time one of the sequence detector means provides an output indicating that its selected sequence has been detected; it is reset to begin another sequence detection cycle. The outputs from the second sequence detector means during a predetermined period are loaded into first and second integrating shift register means. At the end of the predetermined period, decision means compares the contents of the first and second integrating shift register means, and provides a data output based upon the contents of the first and second integrating shift register means. In this way, the sequence which was detected the most times during the period determines the data output from the decision means. Also, the above patent to Mass et al., discloses a method for estimating the frequency of a time signal by means of a discrete Fourier transformation and interpolation, without analyzing sampled data using over sampling. It also uses zero padding in a multi sample, multi frequency message with high speed to determine the data content of the message.

Advantageously, the present invention is applicable for both one carrier Narrow Band Frequency Modulation (NBFM) system and for a multiple carrier system. For multiple carrier transmission systems (each carrier has a mark and a space frequency). Either a Band Pass Filter (BPF) or matched filter schemes are used to separate the frequencies in a multiple carrier parallel system.

Further, the present invention provides a Frequency Shift Keying (FSK) demodulator that can be used to demodulate Narrow Band Frequency Shift Keying (NBFSK) data. The Frequency Shift Keying (FSK) provides reduced distortion of the mark/space ratio of the demodulated data in the event of a variable Frequency Shift Keying (FSK) center frequency where a phase locked loop is used to determine frequencies. The demodulator preferably includes a low pass filter for coupling the output voltage of the phase locked loop to the D.C blocking means.

SUMMARY OF THE INVENTION

The present invention contemplates a Multiple (m) carrier Narrow Band Frequency Modulation (NBFM) system using orthogonal frequencies. The mark and space frequencies are orthogonal frequencies before Inverse Fast Fourier Transform (IFFT) is applied to create a time domain signal. Here Fast Fourier Transform (FFT) or matched filters are used at the receiver to separate the outputs of each frequency band. This Narrow Band Frequency Modulation (NBFM) system using orthogonal frequencies increases data capacity and rates between a Transmitter and a Receiver by a ratio equal to the number of different pairs of orthogonal carriers (n) between the transmitter and the receiver by m!n! (m−n)!

The present invention also contemplates a communication system for sending and receiving data. The system comprises a transmitter and a receiver. A general binary coded Orthogonal Frequency Data Modulated carrier scheme is provided between the transmitter and the receiver to increase code density and data rate per Hz of bandwidth. A plurality of narrow band carrier frequencies that are orthogonal are transmitted in a binary coded fashion to represent data.

DETAILED DESCRIPTION OF THE PREFERRED EMBODIMENTS

The present invention contemplates a Multiple Orthogonal locked frequencies Narrow Band Frequency Shift Keying (Mary-NBFSK) system. Multiple orthogonal locked frequencies Narrow Band Frequency Shift Keying (Mary-NBFSK) communication systems with multiple orthogonal frequencies locked to the same carrier are used instead of using multiple parallel, individually coded, binary Frequency Shift Keying (FSK) communication system. The Multiple Orthogonal locked frequencies Narrow Band Frequency Shift Keying (Mary-NBFSK) has several advantages over multiple binary Narrow Band Frequency Shift Keying (Binary NBFSK), first it has less hardware, second it achieves reduced power consumption and third it has a higher code density/Hz of bandwidth.

Multiple Orthogonal locked frequencies Narrow Band Frequency Shift Keying (Mary-NBFSK) transmits one or multiple frequencies (carriers) at a time. While in a multiple binary Frequency Shift Keying (FSK) mode, each carrier is transmitted when a modulating bit is high, e.g. 3 carriers for 3 FSK systems. In Multiple Orthogonal locked frequencies Narrow Band Frequency Shift Keying (Mary-NBFSK) a number of carrier should be two times the number of bits per symbol for efficient transmission.

Figure 1:
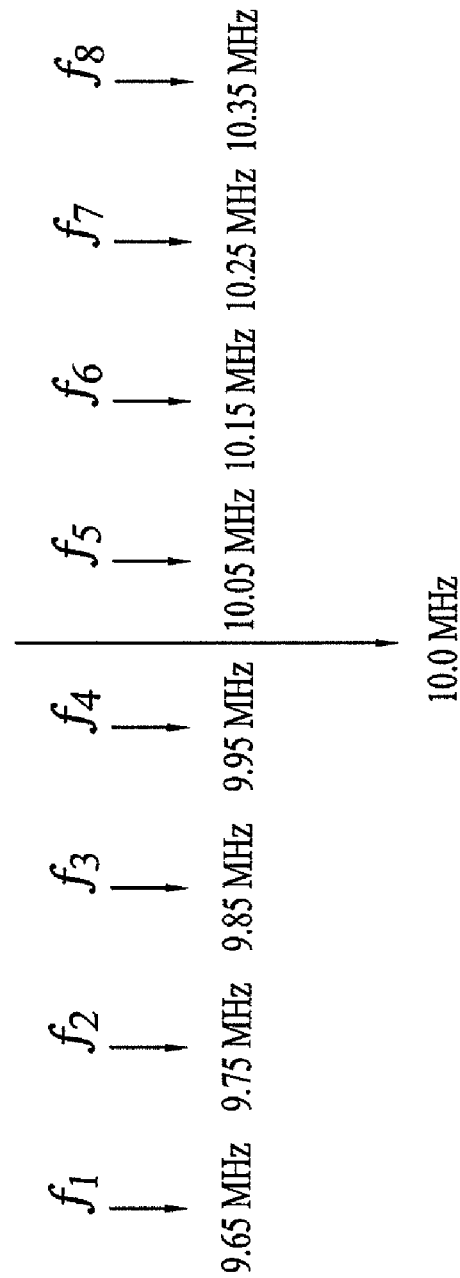
FIG. 1 is a schematic illustration showing 8 frequencies to represent 3 bits.

Referring now to Figures, FIG. 1 shows a schematic illustration of a simplified example of the Multiple Orthogonal locked frequencies Narrow Band Frequency Shift Keying (Mary-NBFSK) system using 1 out of 8 frequencies to represent 3 bits per symbol at a nominal frequency of 10 MHz, and the band spacing between each two successive carriers is 100 KHz. The Mat lab simulation results show the low Bit Error Rate (BER) achieved at high rate and Signal to Noise Ratio (SNR)

Table 1 Illustrates Frequency Shift Keying (FSK) modulation techniques where a FSK size column represents the equivalent number of parallel, and separate Frequency Shift Keying (FSK) channels for the communication system. The Mary FSK system column represents the number of frequencies transmitted over the number of orthogonal and locked frequencies available or used. The BW column describes the available BW for each communication system alternative. The efficiency column represents the BW utilization efficiency in bps/Hz, number of bits sent in one second per Hz i.e., number of bits represented by each frequency is the number of bits received each sample and the number of available combinations used to calculate the number of bits that can be represented by a coded frequency message.

TABLE 1

| FSK Size | Mary FSK system No of used Frequencies | BW | Baud Rate in Kpbs | Efficiency Bps/Hz | No of Bits represented by each Frequency | No of available combination |
| --- | --- | --- | --- | --- | --- | --- |
| FSK 1 Channel 100 KHz | 1/2 | 100 KHz | 600 | 6 | 1 | 2 |

TABLE 1-continued

| FSK Size | Mary FSK system No of used Frequencies | BW | Baud Rate in Kpbs | Efficiency Bps/Hz | No of Bits represented by each Frequency | No of available combination |
|---|---|---|---|---|---|---|
| FSK 3 Channel 450 KHz | 1/8 | 800 KHz | 1800 | 2.25 | 3 | 8 |
| FSK 5 Channel 750 KHz | 1/32 | 3.2 MHz | 3000 | 0.9375 | 5 | 32 |
| FSK 7 Channel 1.05 MHz | 1/128 | 12.8 MHz | 4200 | 0.328 | 7 | 128 |
| FSK 4.5 Channel 675 KHz | 2/8 | 800 KHz | 2700 | 3.375 | 4.5 | 28 |
| FSK 5.5 Channel 825 KHz | 3/8 | 800 KHz | 3300 | 4.125 | 5.5 | 56 |
| FSK 17.5 Channel 2.625 MHz | 5/32 | 3.2 MHz | 10.5 MHz | 3.28 | 17.5 | 201376 |

Figure 2:
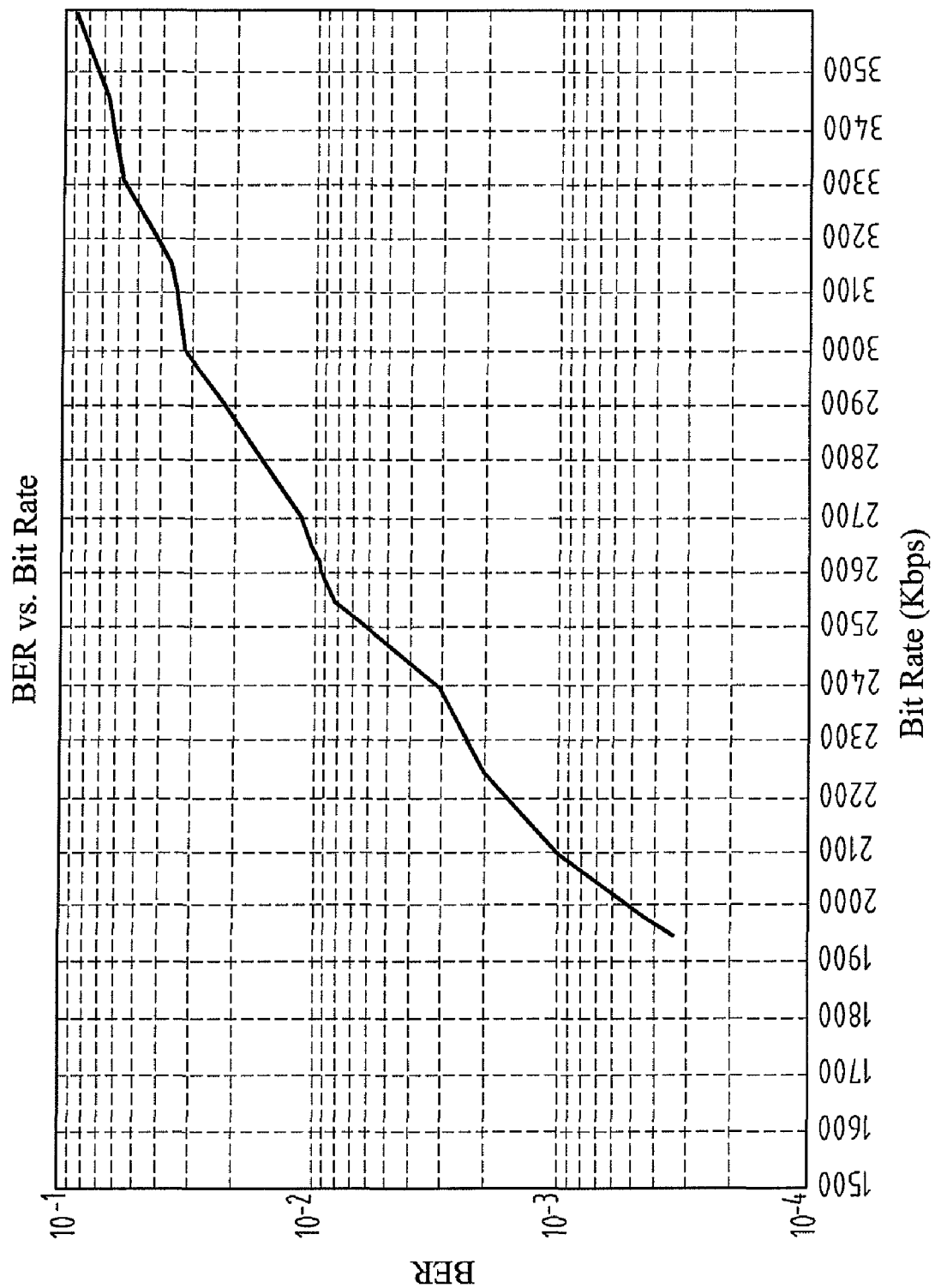
FIG. 2 is a graphical illustration showing Bit Error Rate (BER) versus increasing the Bit Rate at a Signal to Noise (SNR)=10 dB in a 1 of 8 system.

FIG. 2 shows a 1 out of 8 Coded Multiple Frequency Transceiver (CMFT) system and indicates that, the Bit Error Rate (BER) occurs after bit rate reach approximately 3×600 Kbps. The capacity of the individual Narrow Band Frequency Shift Keying (NBFSK) system is 600 Kbps.

Figure 3:
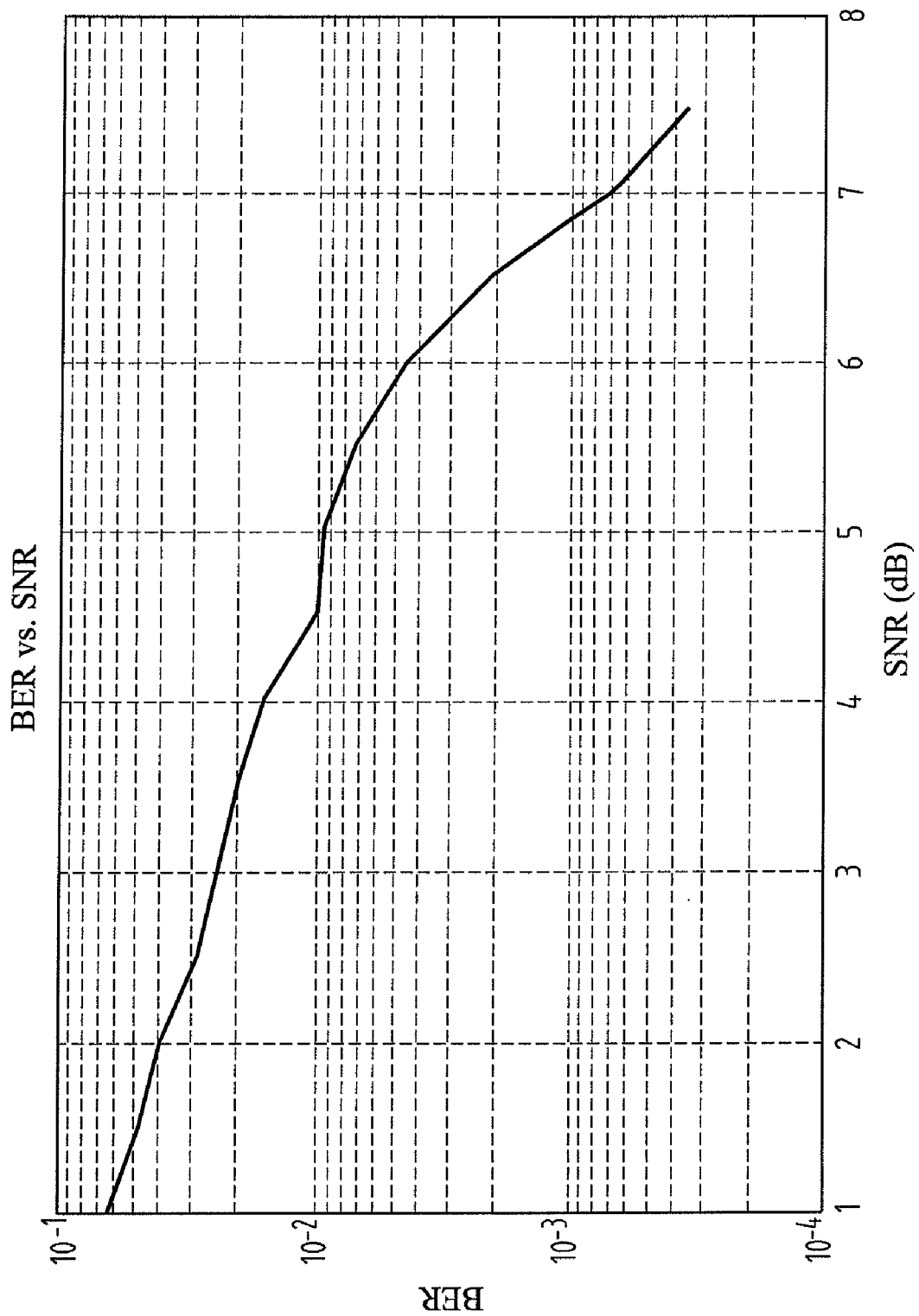
FIG. 3 is a graphical illustration showing Bit Error Rate (BER) versus Signal to Noise ratio (SNR) at a Bit Rate of 1800 Kbps.

For the 1 out of 8 Coded Multiple Frequency Transceiver (CMFT) system, the Bit Error Rate (BER) disappears after the Signal to Noise Ratio (SNR) equals approximately 7.5 dB at bit rate of 1800 Kbps as shown in FIG. 3. This Bit Error Rate (BER) curve versus Signal to Noise Ratio (SNR) is dependent on the bit rate at which data is transmitted. The advantage of the system in accordance with the present invention over a multiple binary Narrow Band Frequency Shift Keying (FSK) system is the reduction in hardware and power consumption as a result of a Fast Fourier Transform (FFT) process that is applied to eight carriers in the system at the receiver instead of 3 Fast Fourier Transform (FFT) processes used for 3 binary Frequency Shift Keying (FSK) systems. In addition high data code density is achieved for a given bandwidth.

This Coded Multiple Frequency Transceiver (CMFT) system allows the user to transmit data using only 4.8 Hz as a bandwidth with a data rate around 2.4 Mbps with a Bit Error Rate (BER) approximately equal to 0 and with frequency separation of 600 KHz or they can reach a data rate of 4 Mbps with Bit Error Rate (BER) approximately equal to 0 but bandwidth will be increased to 8 MHz while frequency separation is increased to 1 MHz.

The 2 of 7 Multiple Orthogonal locked frequencies Narrow Band Frequency Shift Keying (Mary-NBFSK) system enhances the code density per Hz over that achieved in the 1 of 8 system. This technique enhances the 1 of 8 Frequency Shift Keying (FSK) system to increase Bit rate without increasing Bit Error Rate (BER) and with a narrower band. This is done by sending two frequencies instead of one frequency where the transmitter and the receiver have a look up table to represent every 4 bits by two frequencies of the 7 frequencies used.

Further, at the receiver, the frequencies transmitted are known by obtaining the Power Spectral Density (PSD) from which the receiver determines the 2 frequencies transmitted in a 2 of 7 message. Then from the look up table found in the receiver the data that has been transmitted is determined.

Figure 4:
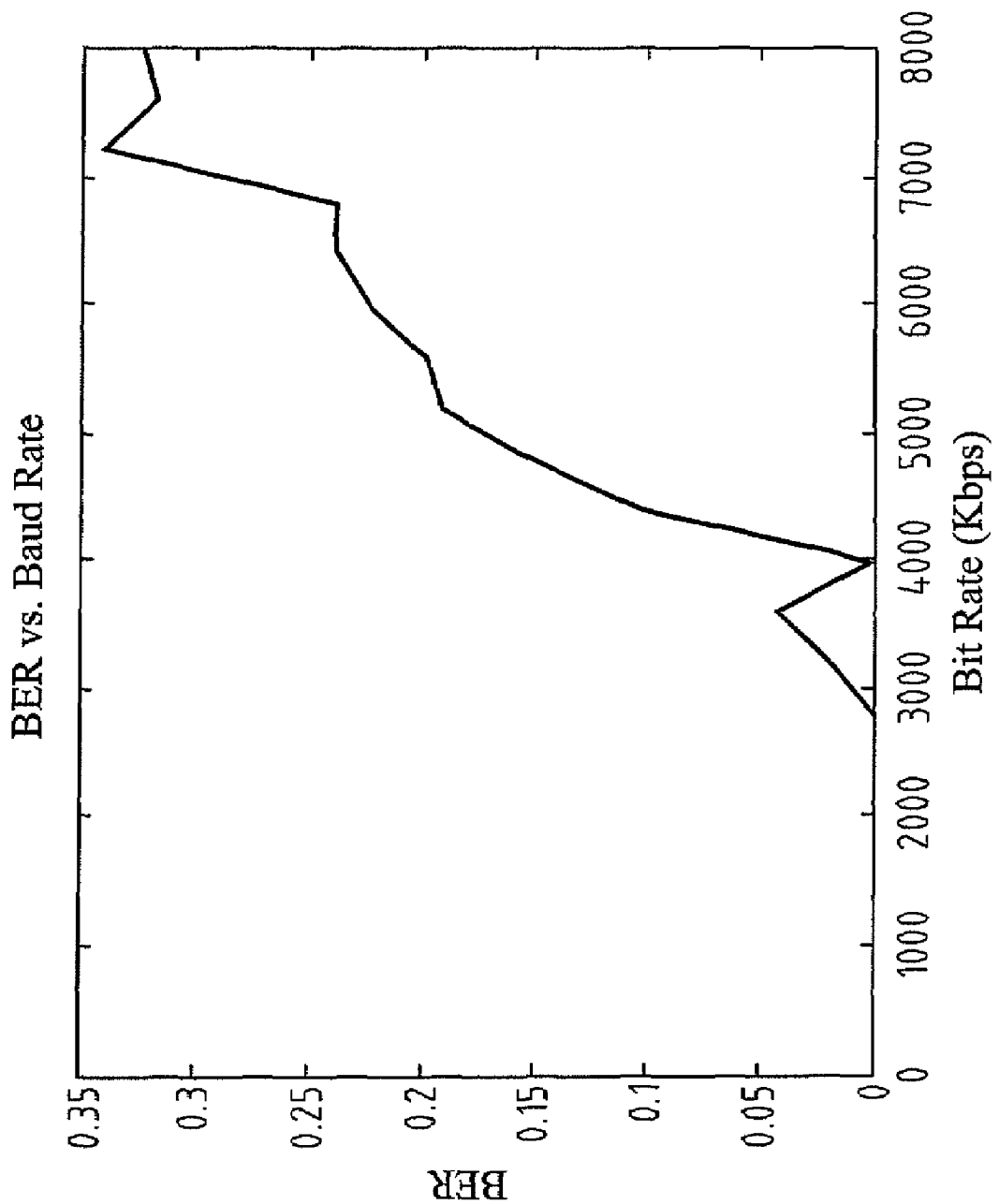
FIG. 4 is a graphical illustration showing Bit Error Rate (BER) versus Baud Rate in a 2 of 7 system
Figure 5:
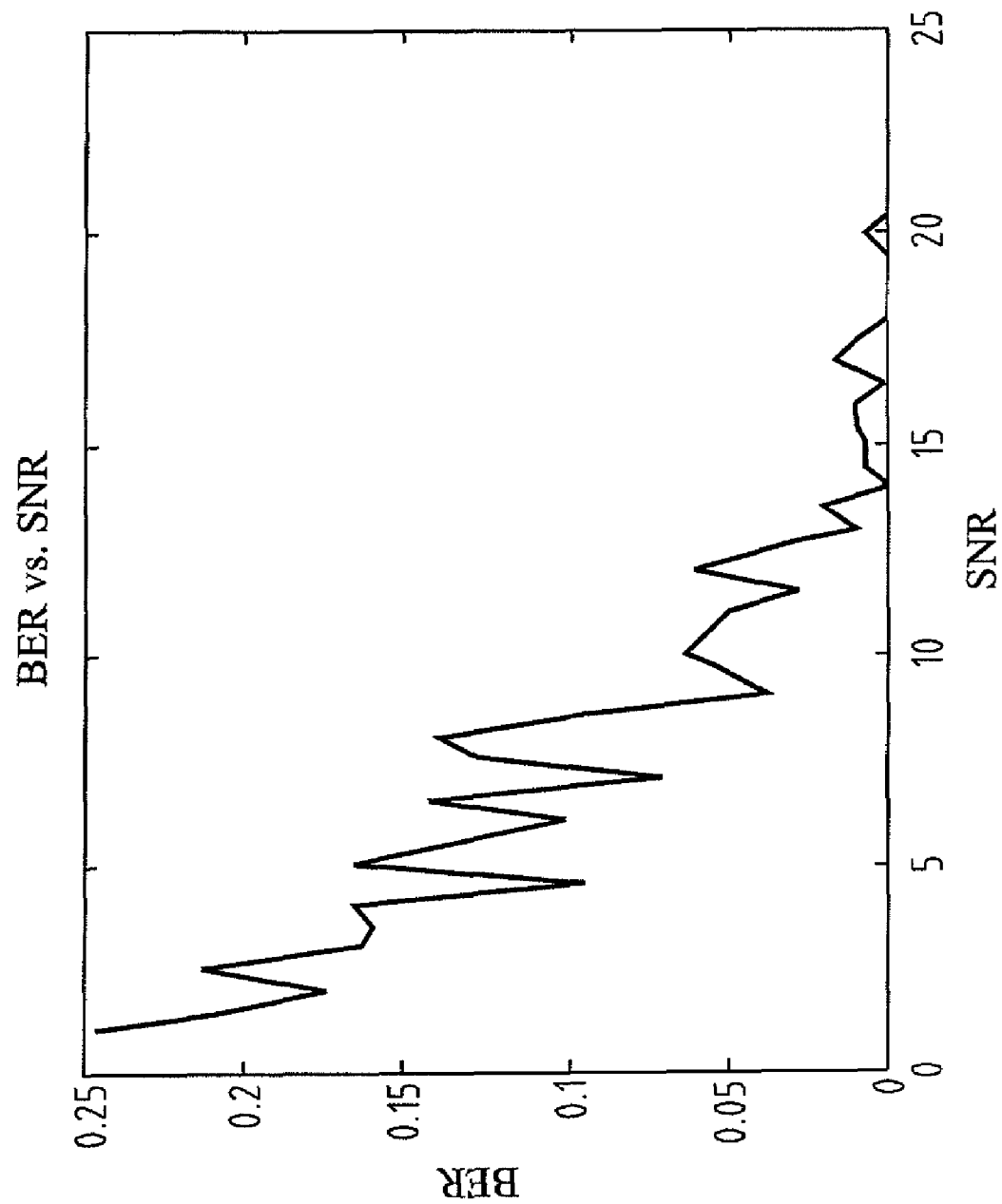
FIG. 5 is a graphical illustration showing Bit Error Rate (BER) versus Signal to Noise Ratio (SNR) in a 2 of 7 system.

As illustrated in FIG. 4, A Mat lab code is used to calculate and draw the Bit Error Rate (BER) for different values of Baud Rate. The results of this simulation describe the relation between Bit Error Rate (BER) and Baud Rate for a 2 of 7 system. Also Mat lab code is used to calculate the Bit Error Rate (BER) for different values of the Signal to Noise Ratio (SNR). FIG. 5 is the result of this simulation on the 2 of 7 system.

Figure 6:
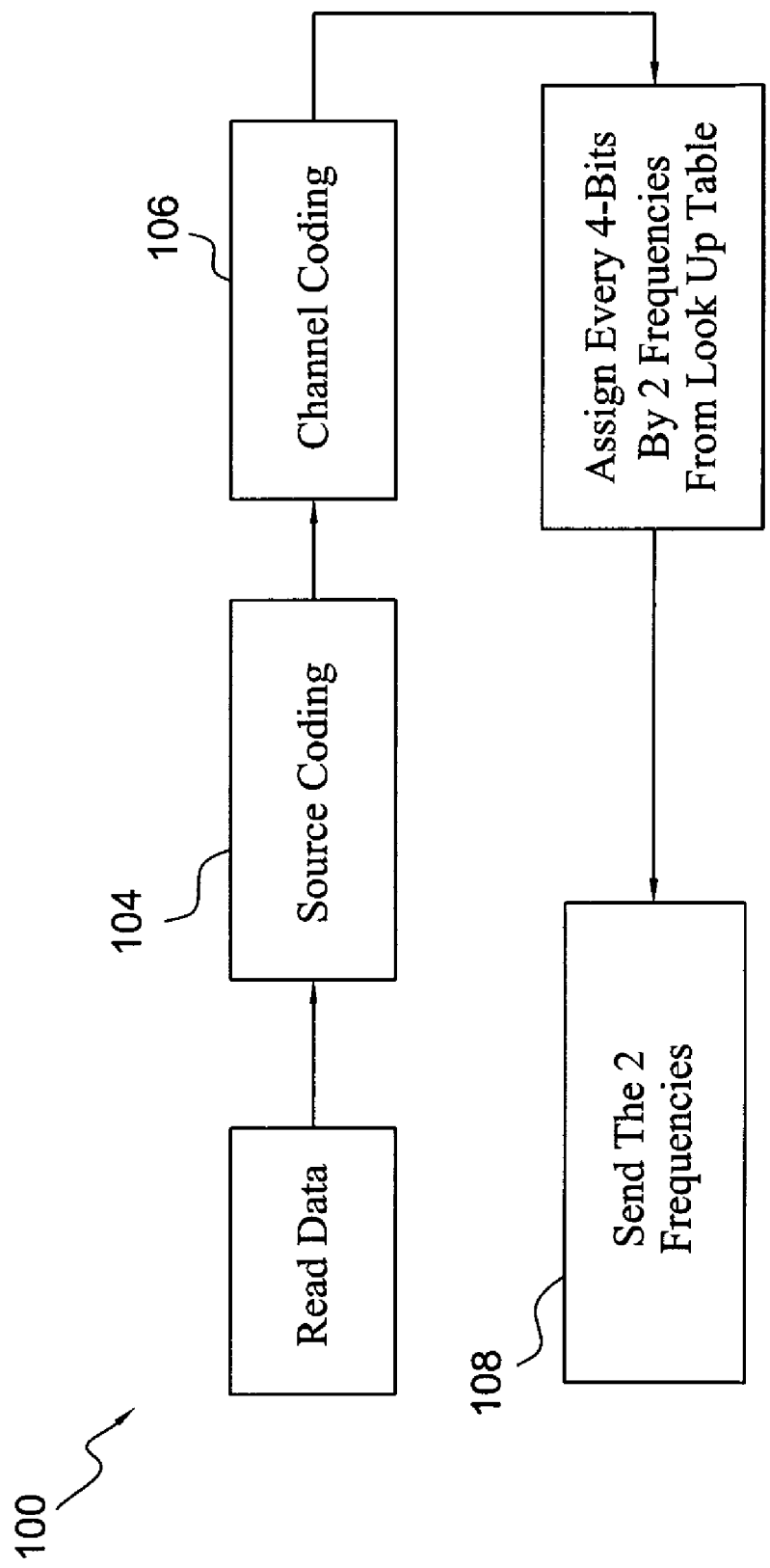
FIG. 6 shows a 2 of 7 code transmitter block diagram in accordance with the present invention.

FIG. 6 shows a transmitter block diagram 100, including the steps used to manipulate the 2 of 7 Multiple Orthogonal locked frequencies Narrow Band Frequency Shift Keying (Mary-NBFSK) wherein, a first block indicates reading data from the file to be transmitted. A second block 104 indicates making the source coding of the data to decrease the amount of data required to be transmitted. Then a channel coding block 106 is provided for channel enhancement. Further, a fourth block 108 is indicative of taking every successive 4 bits and assign 2 frequencies from the available 7 frequencies to represent the 4 digits using a look up table (Not Shown) so that the frequencies can be transmitted. The 2 of 7 code represents more than 4 binary Frequency Shift Keying (FSK) channels. Only 4 Frequency Shift Keying (FSK) channels are represented by the 2 of 7 code, in order to be able to omit codes corresponding to two adjacent frequencies out of available combinations.

Figure 7:
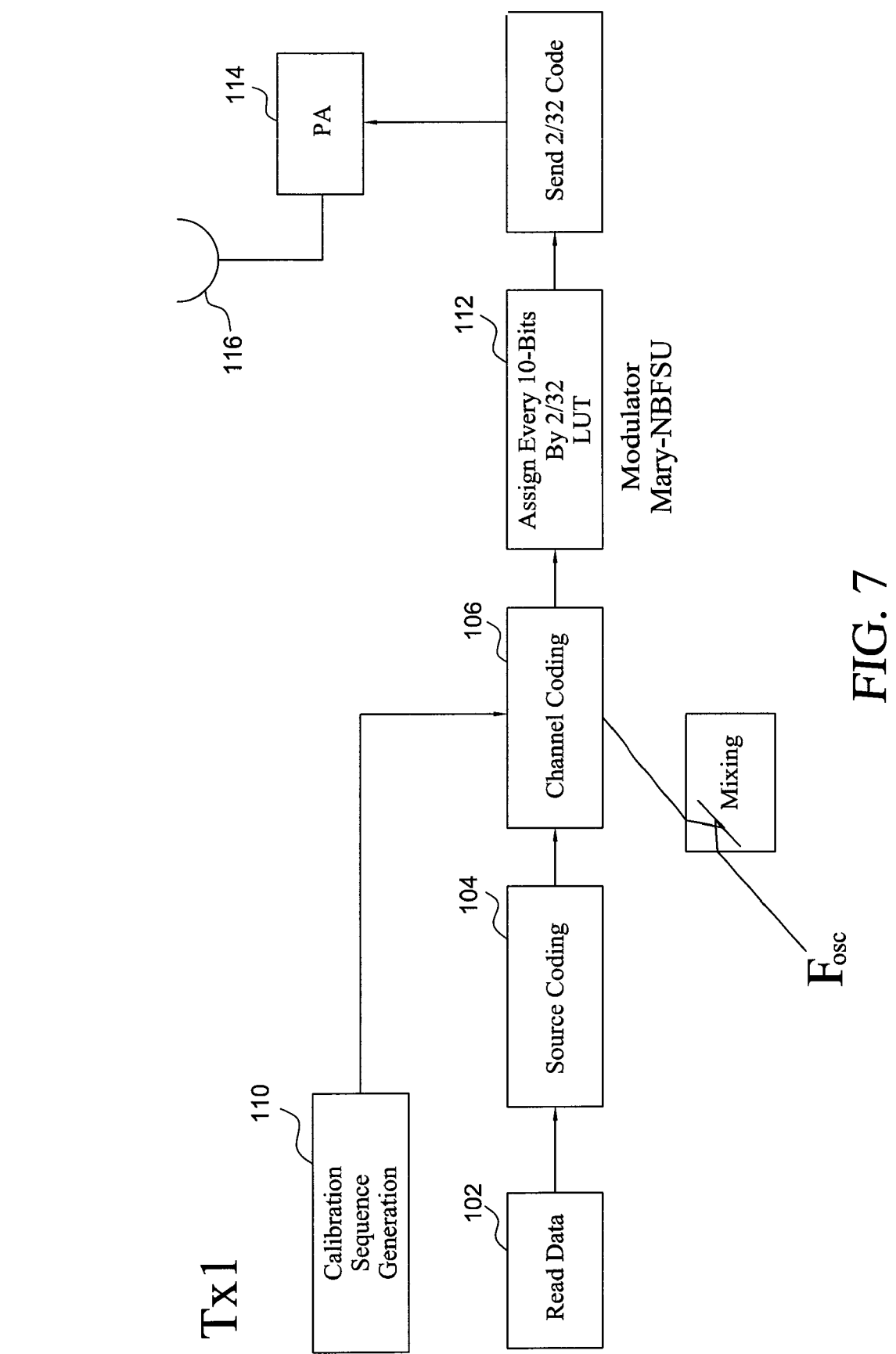
FIG. 7 shows a 2 of 32 code transmitter system in accordance with the present invention.

As shown in the block diagram of the transmitter in FIG. 7, data is read (represented by the first block 102) and coded by a source code (represented by the second block 104) to decrease the amount of data transmitted. The data is then passed onto a channel encoder (represented by the third block 106) to enhance Bit Error Rate (BER). Every group of bits is represented by a bigger group of bits in the encoder to have the ability to detect and correct most of the errors that occur during a transmission process. Also in this stage, the calibration sequence (the output of the calibration sequence generator represented by a fourth block (110)) is added to the data transmitted. The calibration sequence corrects the frequency shift which occurs during the transmission process.

Further, a fifth block 112 assigns every 10 bit combination for example to 2 out of 32 frequencies by a look up table (Not Shown) stored in the transmitter. The data is then ready for transmission where the technique is based on sending two different frequencies of 32 available frequencies to represent all relations of the 9 bits (as an example the bits 010110101. The 9 bits are represented by the frequencies F3 and F22 where receiving these two frequencies means receiving 010110101). Then the two frequencies are generated and passed over a Fast Fourier Transform (FFT) block (Not Shown) and the output is entered to the power amplifier 114 to be amplified. The output is sent to the antenna 116 for transmission.

Figure 8:
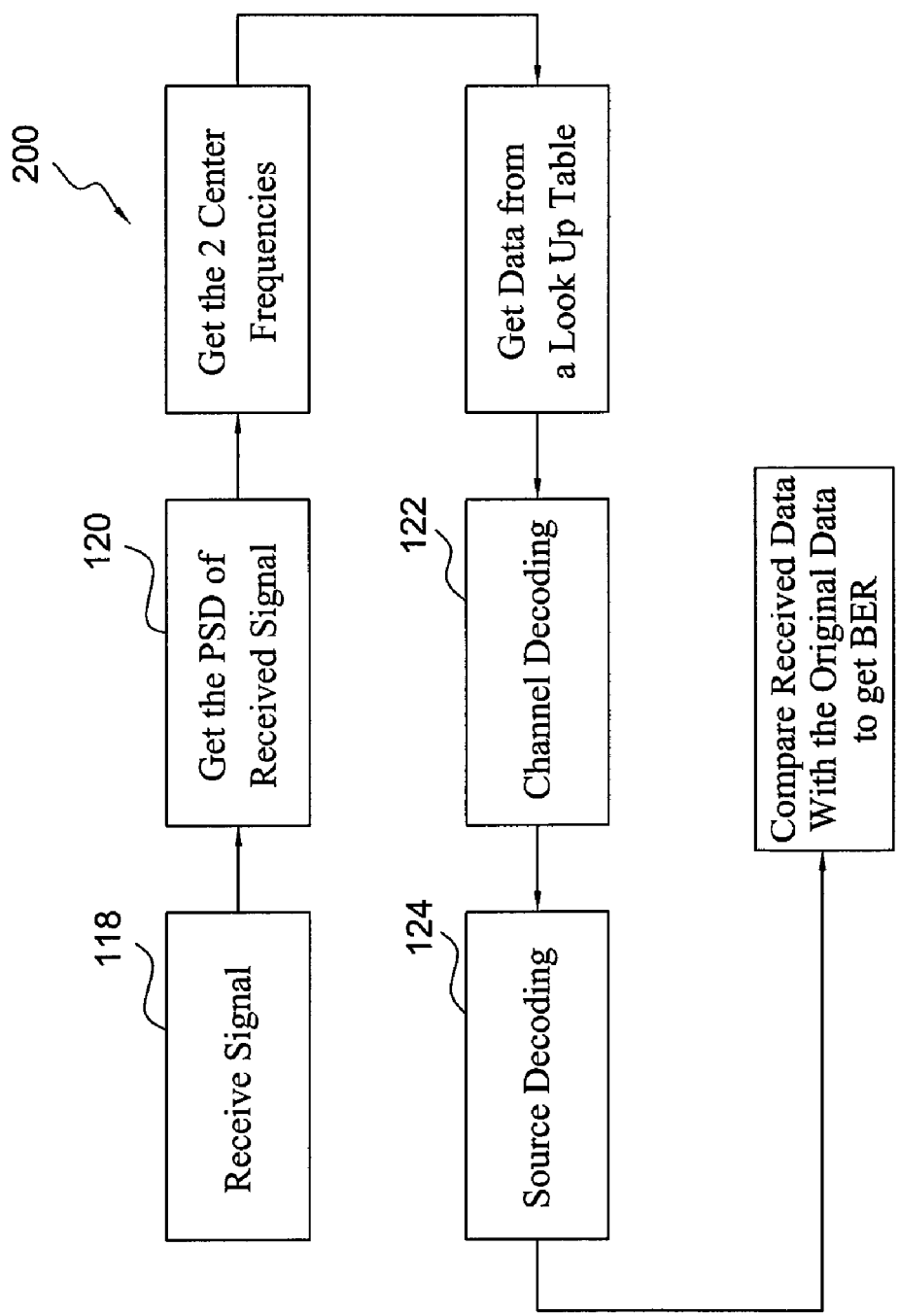
FIG. 8 is a receiver block diagram in accordance with the present invention.

FIG. 8 shows a receiver block diagram 200 which receives the signal (represented by a block 118). A Power Spectral Density (PSD) technique is used to determine the frequencies received and a look up table is used and the receiver allocates the data that has been sent (represented by a second block 120). The channel decoding (represented by a third block 122) is done to correct errors that may have happened. The source decoding (represented by a fourth block 124) by a source decoder is used to obtain the original data and compare with the sent data is done to calculate the Bit Error Rate (BER).

Figure 9:
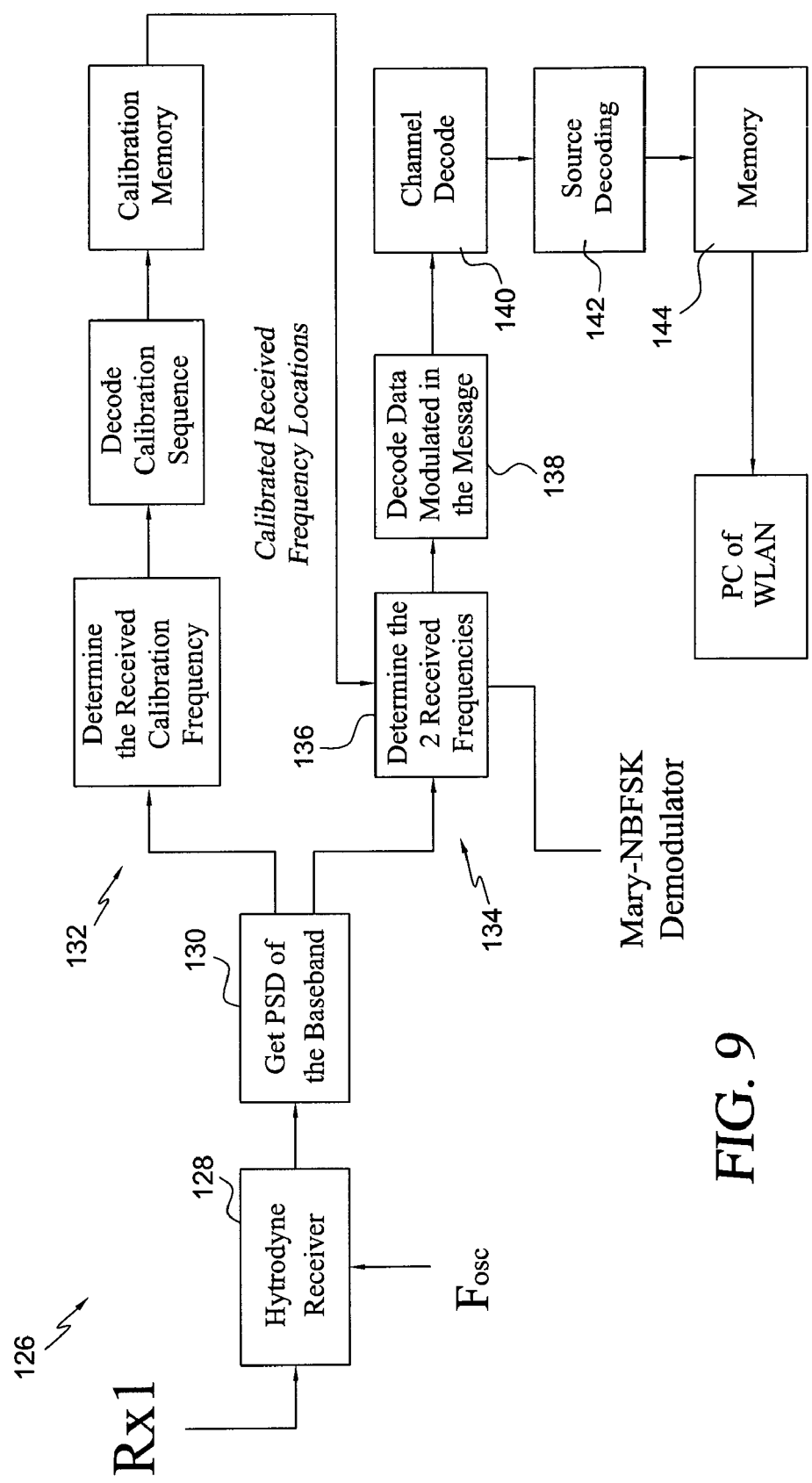
FIG. 9 shows a receiver system in accordance with the present invention.

A receiver system 126 for use in the present invention is shown in FIG. 9. The receiver system 126 receives the data using a heterodyne receiver (represented by a first block 128). The output is passed over an Inverse Fast Fourier Transform (IFFT) block to get a Power Spectral Density (PSD) (represented by a second block 130) in the base band. The output is connected to the calibration path 132 and used to determine the received calibration sequence and from the calibration memory the frequency offset is determined.

The input to the receiver path 134 is passed on to the 2 received frequencies block 136 first to obtain the value of the 2 frequencies received and correct the frequencies using the frequency offset (output of the calibration path). Then, the output is passed over the decode data modulated in message block 138 to obtain the transmitted bits from a look up table (Not Shown) stored on the receiver. The output is passed over both the channel decoder (140) and source decoder (142) and then data is stored in memory (144).

Figure 10:
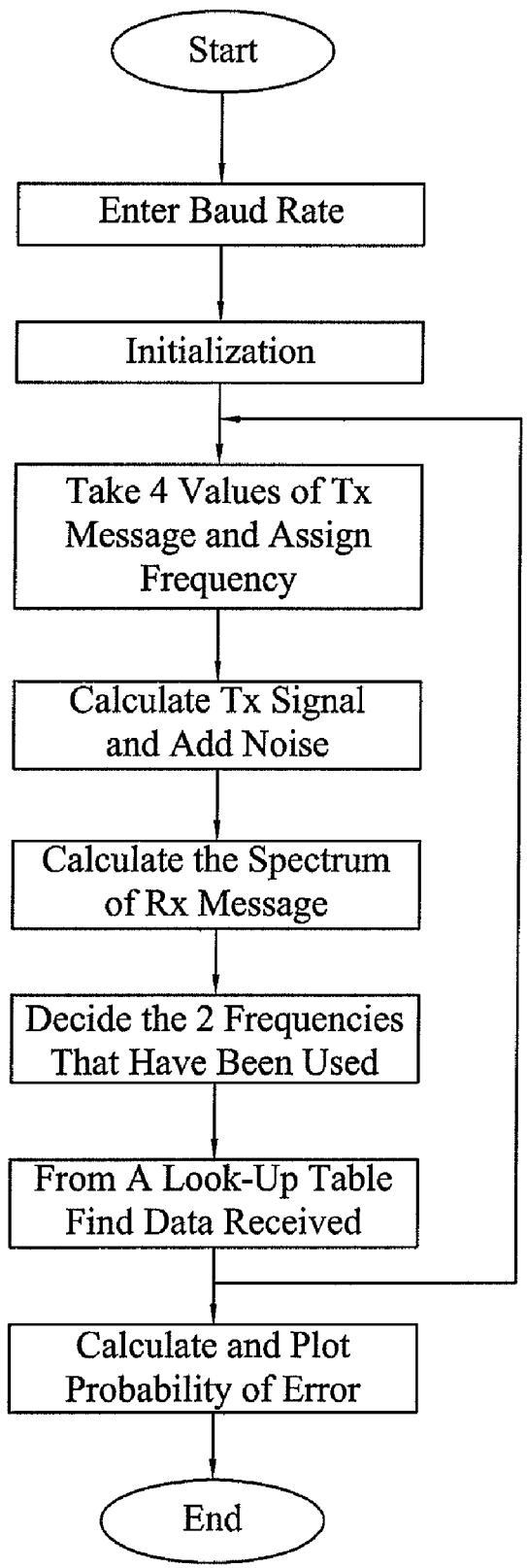
FIG. 10 is a 2 of 7 Mary Narrow Band Frequency Shift Keying (Mary-NBFSK) code flow chart for use in the present invention.

FIG. 10 shows a flow chart for the Mat lab code that simulates the Multiple Orthogonal locked frequencies Narrow Band Frequency Shift Keying (Mary-NBFSK) system. The transmitter and the receiver generate 7 successive frequencies to read the data. Further, every successive 4 bits represented uses 2 frequencies from the available frequencies using a look up table. The output signal is passed over a Fast Fourier Transform (FFT) to get the Power Spectral Density (PSD). Using the Power Spectral Density (PSD), a program obtains the two center frequencies and, from the look up table the program determines the received data. The data received is compared with the transmitted data to calculate the Bit Error Rate (BER). The program plots the Bit Error Rate (BER) versus Signal to Noise ratio (SNR) and Baud Rate to determine the performance of the system.

The 2 of 32 Multiple Orthogonal locked frequencies Narrow Band Frequency Shift Keying (Mary-NBFSK) enhances the 1 of 8 or 1 of n Frequency Shift Keying (FSK) system to increase the Bit Rate without increasing Bit Error Rate (BER) and with a narrow band. This is done by sending two frequencies from 32 frequencies instead of one frequency from 8 frequencies where the transmitter and receiver have a look up table to represent every 6 bits by two frequencies of the 32 available frequencies used.

The transmitter reads the data before transmission and finds the 2 corresponding frequencies from the look up table then transmit them.

Figure 11:
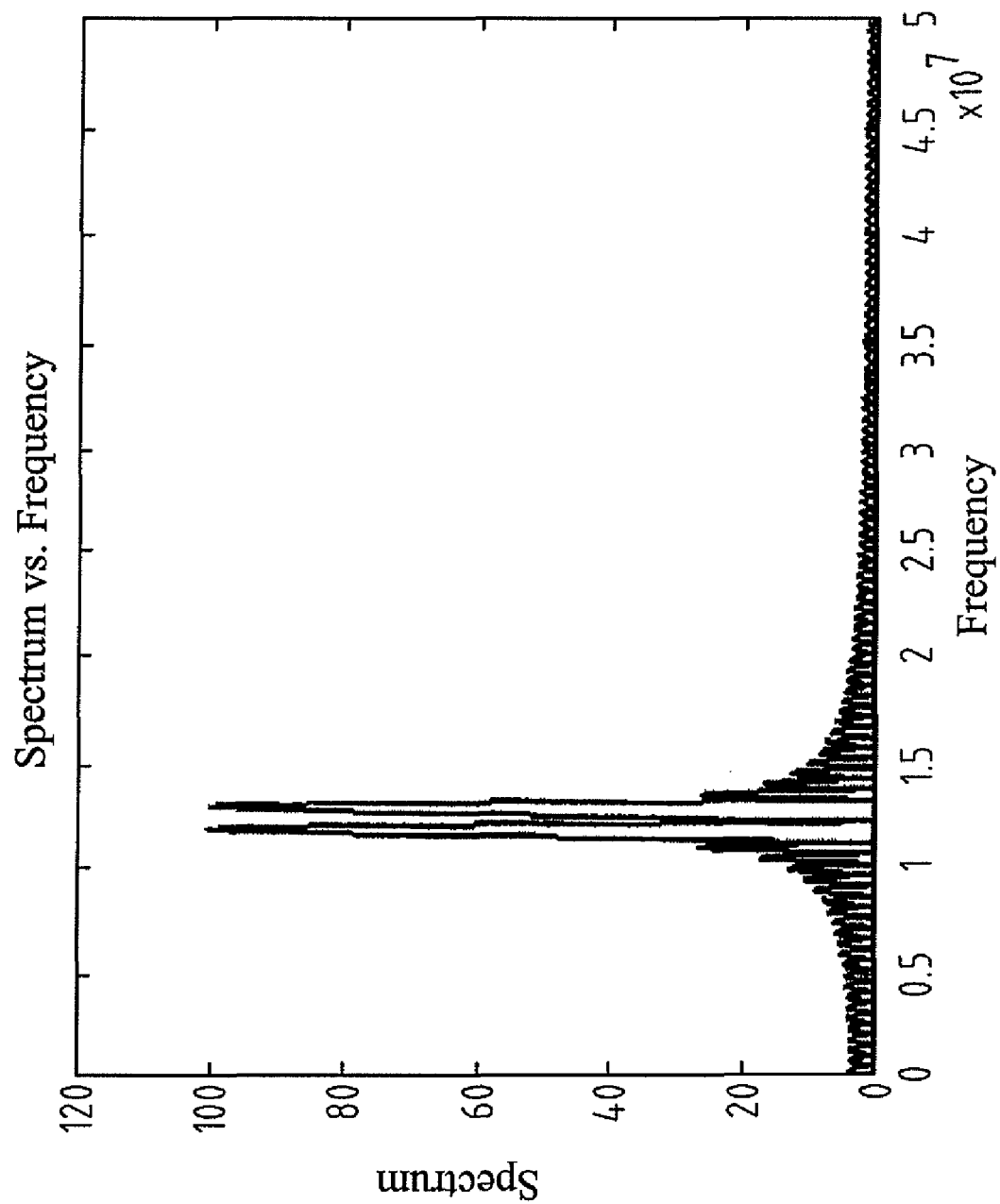
FIG. 11 is a spectrum output of a Fast Fourier Transform (FFT) as used in the present invention.

The receiver performs Fast Fourier Transform (FFT) to get the Power Spectral Density (PSD) and determine the 2 frequencies that have been sent as shown in FIG. 11 and from the look up table it determines the 6 bits of data and stores them.

Using this technique will allow users to transmit their data using 3.2 MHz as a band width and by a rate of data up to 6 Mbps with Bit Error Rate (BER) approximately equal to 0 with carrier frequency separation 100 KHz. The benefit is a higher data rate per Hz of bandwidth.

Figure 12:
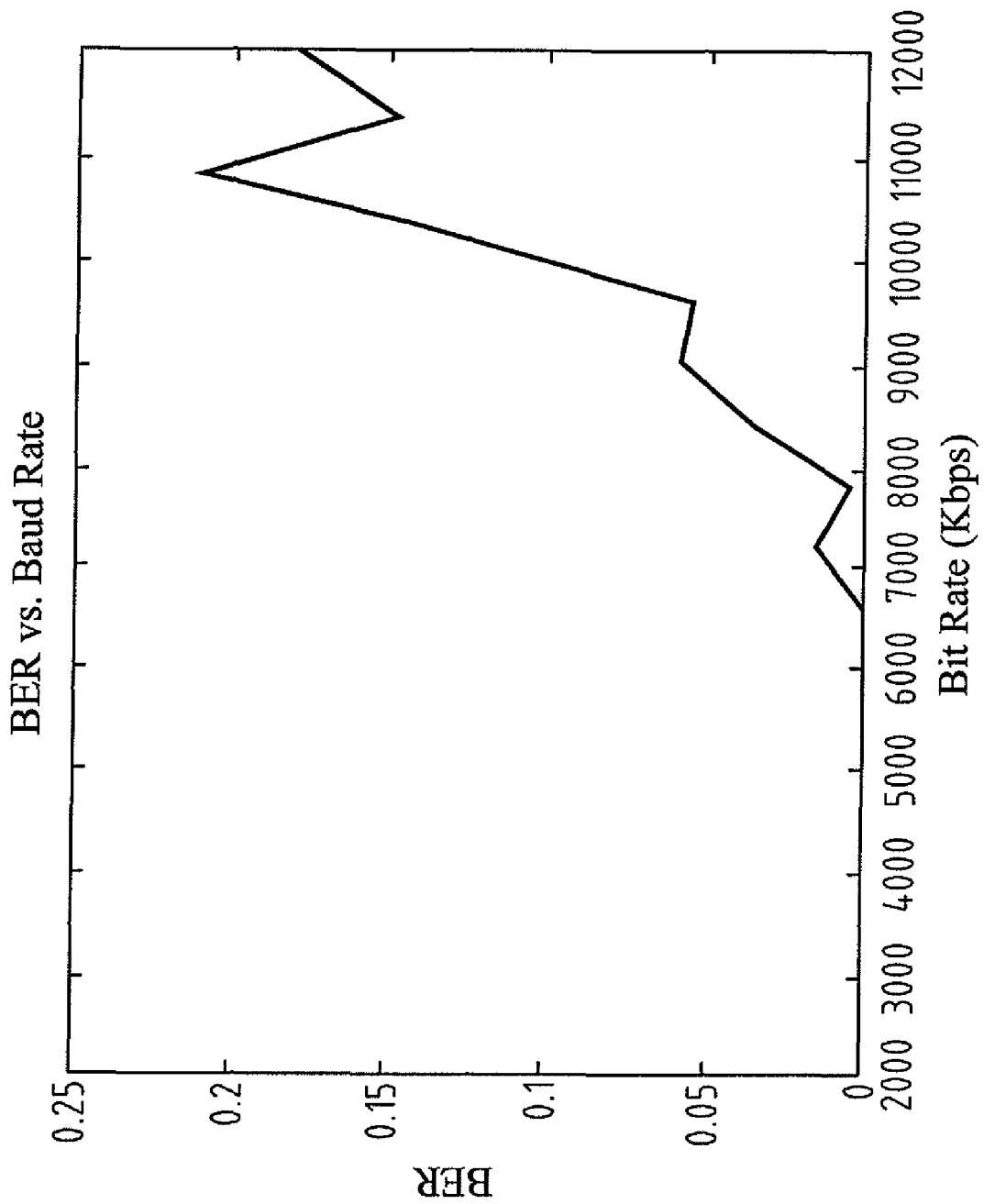
FIG. 12 is a graphical illustration showing Bit Rate versus Bit Error Rate (BER)

A Mat lab code is also used to calculate and draw the Bit Error Rate (BER) for different values of data (Baud) rate FIG. 12 shows the result of this simulation which describes the relation between Bit Error Rate and Baud rate.

Figure 13:
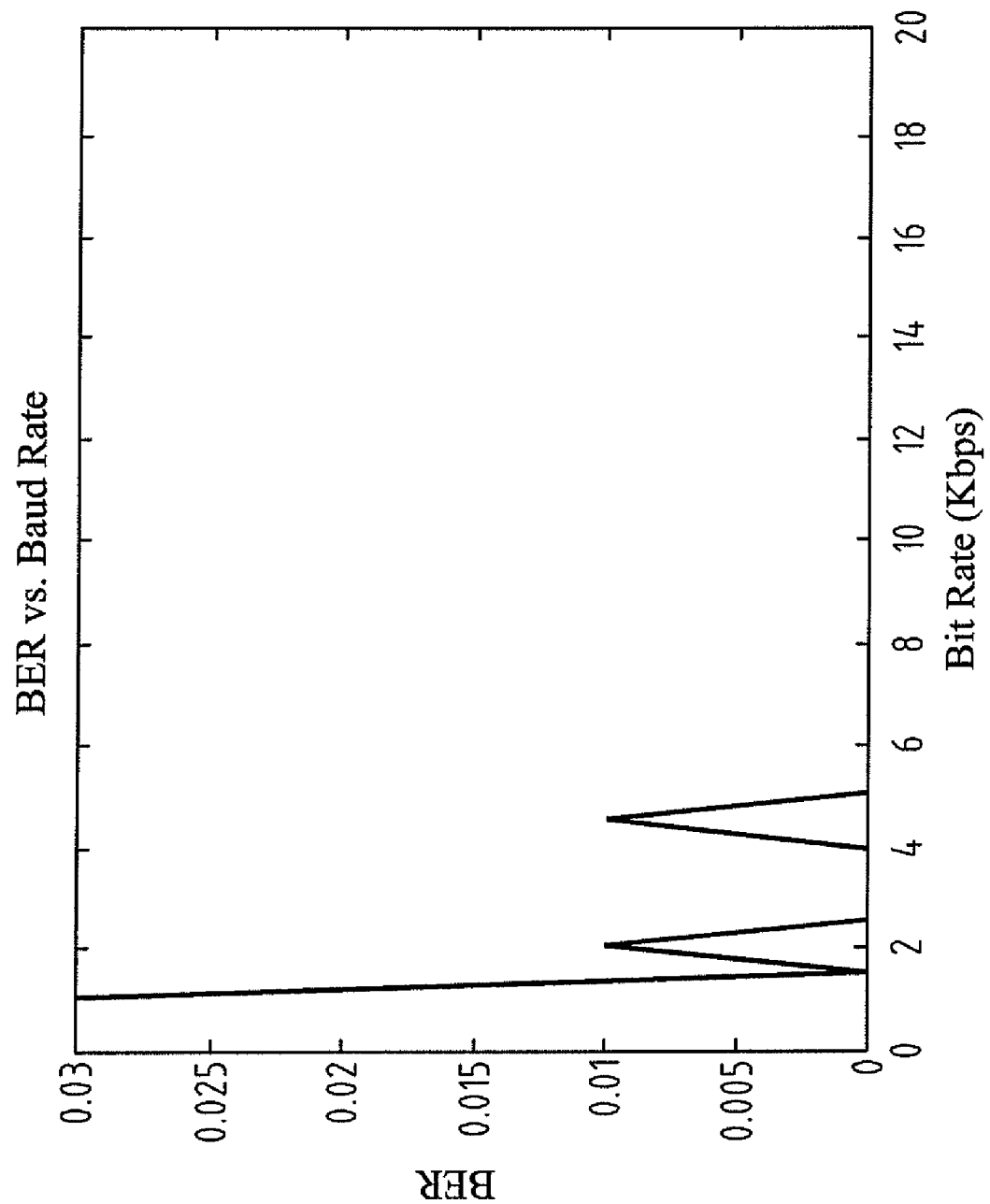
FIG. 13 is a graphical illustration showing Signal to Noise Ratio (SNR) versus Bit Error Rate (BER)

A Mat lab code is also used to calculate the Bit Error Rate (BER) for different values of the Signal to Noise ration (SNR). FIG. 13 illustrates the result of this simulation.

A Digital Signal Processing approach at the receiver is the Fast Fourier Transform (FFT) applied to individual pattern samples. In this technique, each pattern is processed alone at the receiver end, by applying the Fast Fourier Transform (FFT) on the bit samples. They are about 166 sample at baud rate 600 Kbps and sampling rate of 100 MSPS. To obtain high accuracy when applying Fast Fourier Transform (FFT), zero-padding is used in the Fast Fourier Transform (FFT). The center frequency is the frequency at the peak value of the Fast Fourier Transform (FFT) resulting spectrum.

Figure 14:
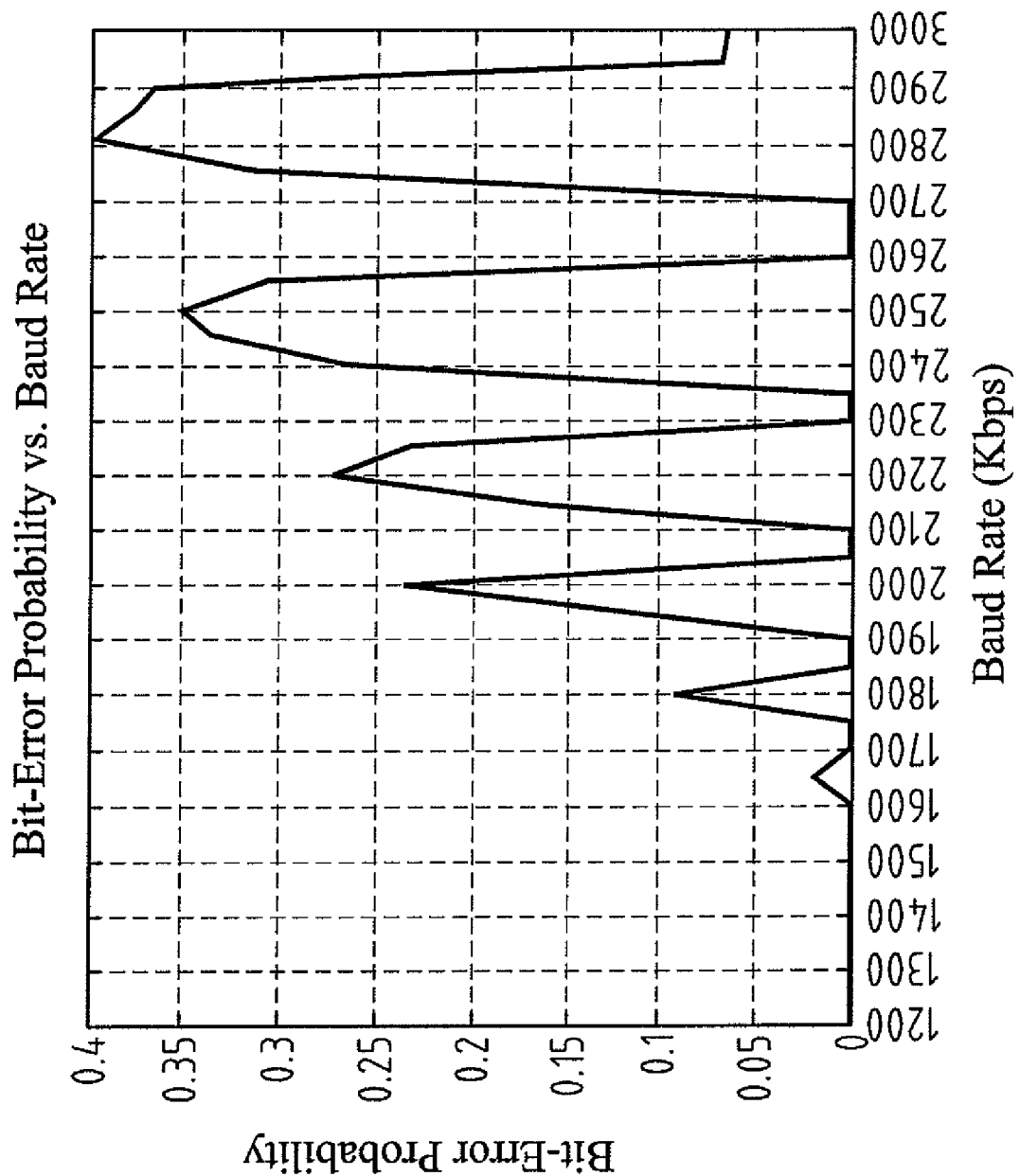
FIG. 14 is a graphical illustration showing Bit Error probability versus Baud Rate.
Figure 15:
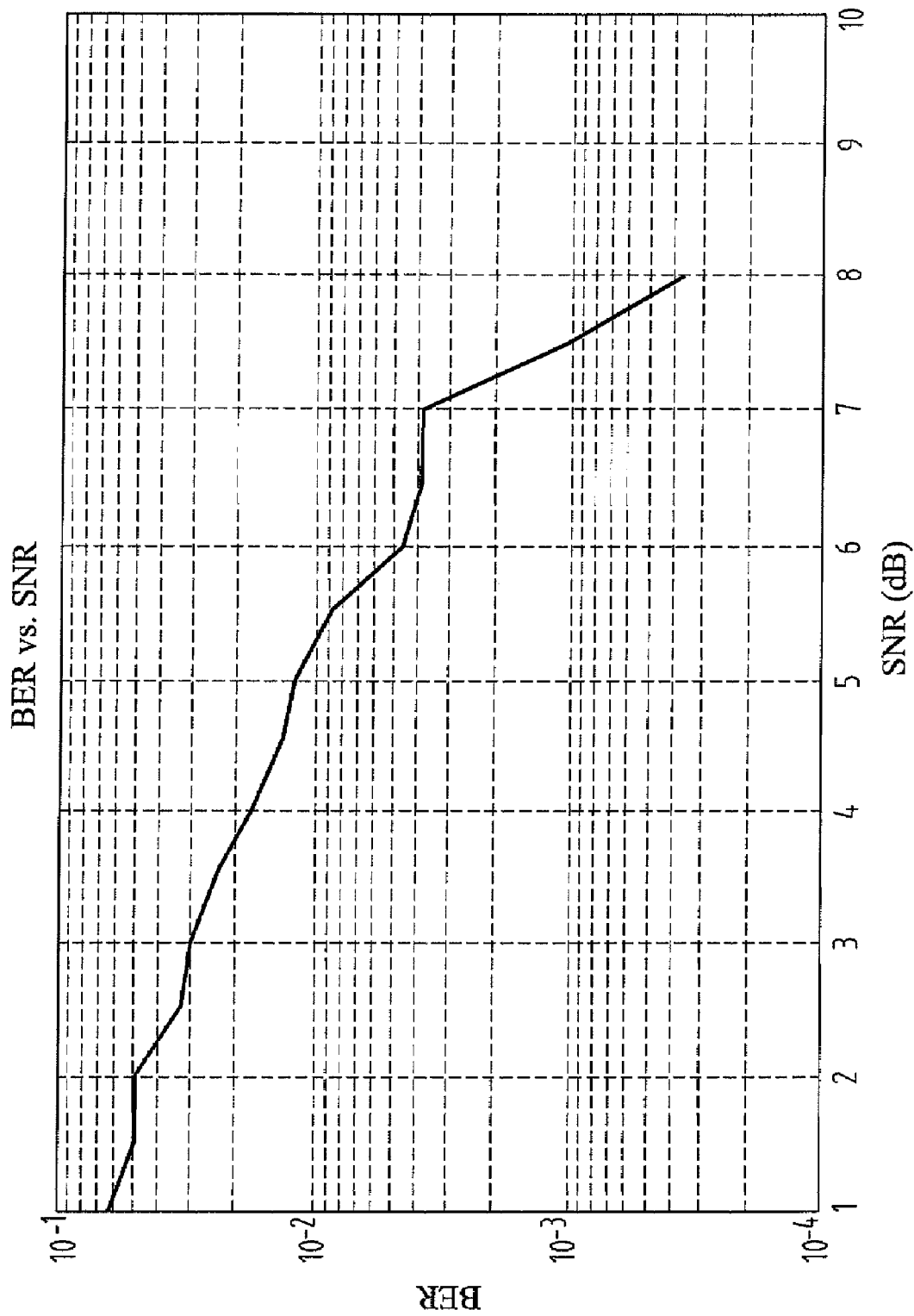
FIG. 15 is a graphical illustration showing Bit Error Rate (BER) versus Signal to Noise Ratio (BER) at a Baud rate of 600 Kbps.
Figure 16:
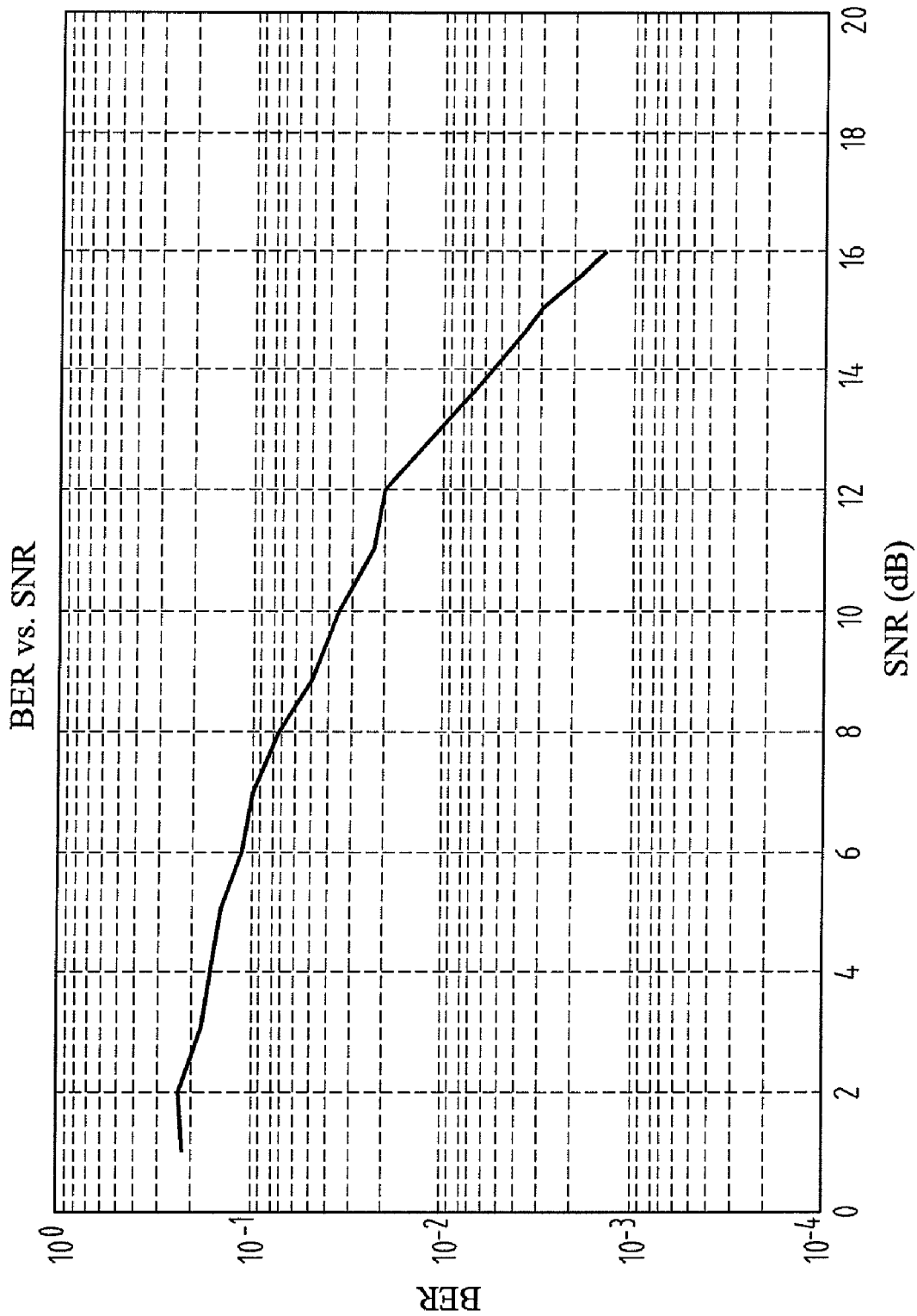
FIG. 16 is a graphical illustration showing Bit Error Rate (BER) versus Signal to Noise Ratio (SNR) at a Baud Rate of 1000 Kbps.
Figure 17:
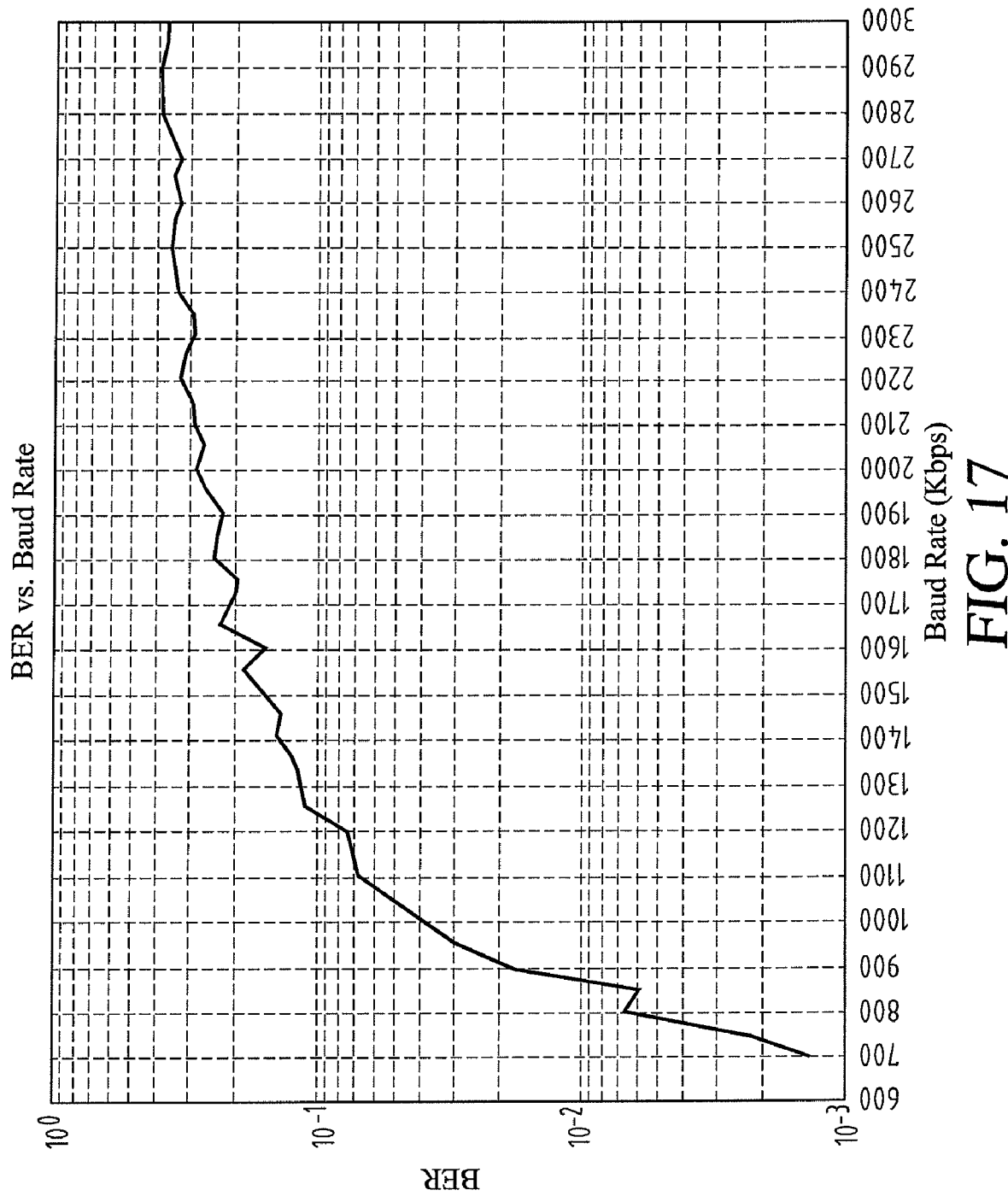
FIG. 17 is a graphical illustration showing Bit Error Rate (BER) versus Baud Rate with Signal to Noise Ratio (SNR).

The Bit Error Rate (BER) output from this third technique is about 0 up to 1600 Kbps, after that a Bit Error Rate (BER) is as illustrated in FIG. 14, but this technique was done without adding noise. After adding white Gaussian noise, the Bit Error Rate (BER) depends on the Signal to Noise Ratio, as shown in FIG. 15. It is sufficient to use Signal to Noise Ratio (SNR) above 8 dB to prevent Bit-Error occurrence at a bit rate of 1000 Kbps, see FIG. 16. As shown in the FIGS. 16 and 17, Bit Error Rate (BER) versus both Signal to Noise Ratio (SNR), and Baud Rate is plotted The receiver uses Zero-padding on the received frequency to obtain the decision in the Digital Signal Processor (DSP) system whether the received bit is 0 or 1. The Fast Fourier Transform (FFT) is applied to the received sample padded with 10000−166=9834 zeros.

The advantages of the zero-padding techniques are: Fewer numbers of operations compared to the Power Spectral Density (PSD) technique applied to the received message. The Power Spectral Density (PSD) technique calculates the Power Spectral Density (PSD) on the spectrum output of a Fast Fourier Transform (FFT), in order to determine the center frequency.

The decision of the current received pattern is independent of the previous received pattern, while in the Power Spectral Density (PSD) the current received bit decision process depends on the previous calculated received bit center frequency which may be affected by noise. Thus the current decision is affected.

Also the zero padding technique is memory-less because current bit decision does not depend on the previous received bits. i.e. the Digital Signal Processor (DSP) does not need to store the whole message, as in the Power Spectral Density (PSD) only technique.

What is claimed is:

1. A communication system for sending and receiving data, said system comprising:
    a transmitter and a receiver wherein a general binary coded Orthogonal Frequency-Division Multiplexing carrier scheme is provided between said transmitter and said receiver to thereby increase code density and data rate per Hz of bandwidth;

a plurality of narrow band carrier frequencies, wherein, said narrow band frequencies are orthogonal and are transmitted in a binary code to represent data; and wherein, said narrow band carrier frequencies includes narrow band separation between orthogonal carriers of the order of 0.1 MHz and providing a bandwidth of the order of 3.2 MHz for 32 carriers thereby allowing said bandwidth to transmit at least 6 Mbps in a 2 of 32 Orthogonal Frequency-Division Multiplexing.

2. The communication system as called for in claim 1 that includes an encoder and a decoder and wherein, said transmitter and said receiver are configured to use said encoder and said decoder and said decoder having a look up table for converting code to frequency and vise versa and wherein, said look up table is reprogrammable, operable to assign codes to different frequencies and indicate to said receiver to select a different look up table version for a different frequency thereby improving transmitted data security.

3. The communication system as called for in claim 1, wherein, said transmitter transmits a multiple carrier frequency modulated by data using frequency shift keying technique or binary frequency modulation technique.

4. The communication system as called for in claim 1, wherein, said receiver, is configured to detect a multiple carrier frequency modulated by data, said multiple carrier frequency modulated by data transmitted by said transmitter to said receiver using a Digital Signal Processor Fast Fourier Transform technique.

5. The communication system as called for in claim 1, wherein, said receiver, is configured to detect a multiple carrier frequency modulated by data, said multiple carrier frequency modulated by data transmitted by said transmitter to said receiver using a Power Spectral Density technique.

6. The communication system as called for in claim 4, wherein, said receiver is operable to decode two or more frequencies from a set of orthogonal carriers simultaneously.

7. The communication system as called for in claim 1, wherein, said system configured to use a digital message memory to store the decoded data for each received message.

8. The communication system as called for in claim 1, wherein, said receiver processes multiple binary carriers simultaneously in a single Fast Fourier Transform processor thereby resulting in reduction in hardware and power consumption.

9. The communication system as called for in claim 1, wherein, said binary coded Orthogonal Frequency-Division Multiplexing carrier having orthogonal frequencies adapted to be decoded at said receiver using a plurality of matched filters.

10. The communication system as called for in claim 1, wherein, said receiver uses a Zero-padding technique on received frequency to obtain a decision in a Digital Signal Processor (DSP) system, thereby determining whether the received bit is 0 or 1.

* * * * *